Patented Dec. 8, 1942

2,304,101

UNITED STATES PATENT OFFICE 2,304,101

ACYL CHLORIDES AND KETONES DERIVED THEREFROM IN THE CYCLOPENTANO-PHENANTHRENE SERIES AND METHOD OF PREPARING SAME

Percy L. Julian, Maywood, and John Wayne Cole, Chicago, Ill., assignors to The Glidden Company, Cleveland, Ohio, a corporation of Ohio No Drawing. Application April 16, 1941, Serial No. 388,899

10 Claims. (Cl. 260—397.3)

The present invention relates to certain degradation products of bile acids and acids secured by oxidative degradation of sterols, and more particularly relates to ketones of the cyclopentano hydrophenanthrene series.

The object of the present invention is to provide a simpler and cleaner series of reactions whereby bile acids, or acids secured by oxidative degradation of sterols, might be converted into ketones. Another object of the invention is to afford a method for securing tertiary carbinols from the acids mentioned above purer and in better yields. Other objects will become apparent to those skilled in the art.

Surprisingly little work has been done with acyl chlorides in the cyclopentanophenanthrene series. In fact in the literature we could find description of only two such acyl chlorides, namely 3-acetoxy-cholenyl chloride (J. Pharm. Soc. Japan, 58, 548, 669 (1938)) and 3-acetoxy-etio-cholenyl chloride (Helv. Chim. acta 21, 1164 (1938)). We have found that $\Delta^5$-3-acetoxy-bisnorcholenic acid is readily converted into a crystalline chloride by the action of thionyl chloride under suitable conditions, and we are describing this crystalline chloride, M. P. 130° C. for the first time.

$\Delta^5$-3-acetoxy-bisnorcholenyl chloride (Formula I) is a useful raw material in the synthesis of valuable compounds in the cyclopentanophenanthrene series. It reacts very smoothly, for example, with phenyl zinc chloride to give $\Delta^5$-3-acetoxy-ternorcholenyl-phenyl ketone, (Formula II) in almost quantitative yield. This ketone, melting point 217° C., is described for the first time. In this reaction the acetoxy-group is left almost completely intact by the phenyl zinc chloride, thus avoiding the side reactions and large excess of reagent used when the Grignard reagent is employed for such purposes.

The reaction from (I) to (II) is so clean that it affords an extremely convenient and economical method for converting $\Delta^5$-3-acetoxy-bisnorcholenic acid into the tertiary carbinol (III). Bile acids, or acids secured by oxidative degradation of sterols, are usually converted into such tertiary carbinols as (III) via their methyl esters and by subjecting the latter to the action of the Grignard reagent. These esters have in the past usually been secured by action of diazo-methane on the acid, a costly and time consuming procedure not suited to large scale commercial production. Moreover, for best results in degrading $\Delta^5$-3-acetoxy-bisnorcholenic acid, the 3-hydroxy acid ester has been employed, thus avoiding the formation of diphenyl methyl carbinol and further excess of Grignard reagent occasioned by use of the 3-acetoxy compound. This preparation of hydroxy from acetoxy acid, however, introduces another step in the preparation of the tertiary carbinol (III) since the acetoxy-acid is the product secured on ozonization or suitable oxidation of stigmasterol acetate. Further the usual procedure for converting the ester of $\Delta^5$-3-hydroxy-bisnorcholenic acid into the tertiary carbinol (III) demands considerable excess and high concentration of the Grignard reagent, as well as relatively high temperatures. These conditions are favorable for the Grignard reagent to act as a good reducing agent, thus giving rise to secondary alcohols instead of the tertiary alcohol (III).

The preparation outlined in Formulas I to III above obviates most of the above difficulties. These reactions give the tertiary carbinol (III) in a yield better than 86% of the theoretical (based on bisnorcholenic acid) while the usual reported yields give about 56% of the theoretical. Thus valuable material is saved and the end product is much purer.

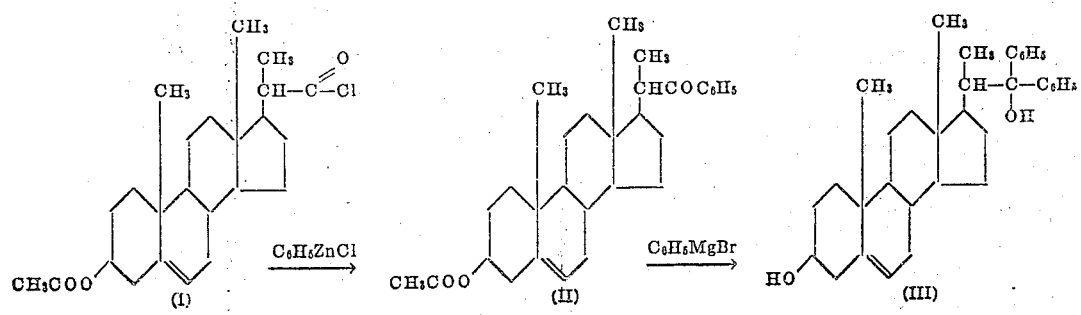

With methyl zinc chloride or cadmium dimethyl, the acyl chloride (I) gives the methyl ketone corresponding to (II) and this ketone has interesting properties, serving among other things as another route to tertiary carbinols similar to (III). Likewise other zinc, cadmium and aluminum alkyls and phenyls give the corresponding ketones.

The following examples illustrates the invention:

EXAMPLE 1.—*Preparation of $\Delta^5$-3-acetoxy-bisnorcholenyl chloride (I)*

To a solution of 2 grams of $\Delta^5$-3-acetoxy-bisnorcholenic acid (melting point 234°) in 50 cc. of absolute ether, 0.9 cc. of thionyl chloride and 0.01 gram pyridine are added. This mixture in a 200 cc. round bottom flask, protected by a calcium chloride drying tube, is allowed to stand with occasional gentle shaking for two hours, the acid dissolving to give a clear, colorless solution. The solution is evaporated in vacuo to dryness, 3 cc. of benzene added and again taken to dryness in vacuo. Then 5 cc. of benzene is added and the solution cooled. A quantitative yield of colorless crystals (needles) of the acid chloride separates. They are washed with 1 cc. of benzene and melt sharply at 130° C. (uncorr.)

The constitution of this chloride was proved by conversion into the known methyl ester as follows:

0.1 gram of $\Delta^5$-3-acetoxy-bisnorcholenyl chloride is dissolved in 5 cc. of boiling methyl alcohol and the solution evaporated to dryness. The crystal residue of $\Delta^5$-3-acetoxy-bisnorcholenic acid methyl ester melted sharply at 139° C.

EXAMPLE 2.—*Preparation of $\Delta^5$-3-acetoxy-ternorcholenyl phenyl ketone (II)*

From 0.4 gram magnesium, 3 cc. bromobenzene and 200 cc. ether, a Grignard solution is prepared in the usual manner. To the resulting solution, a solution of 2.9 grams of freshly fused zinc chloride in 300 cc. of ether was added. Then 2.0 grams of $\Delta^5$-3-acetoxy-bisnorcholenyl chloride in 70 cc. toluene was added portionwise. The solution was stirred at room temperature for one half hour, then the ether was distilled off, 50 cc. of toluene added and the resulting mass heated on steam bath for four hours. The mixture was then cooled, decomposed with dilute sulfuric acid and extracted with ether. The product was apparently difficultly soluble in ether. Benzene was added to insure solution, the solution washed successively with water, 10% NaOH and water. The solvent was removed and the residue steam distilled for one hour. The solid residue was rinsed out with ether onto a filter funnel and represented a nice crystalline product of melting point 208–210°. From methyl ethyl ketone it crystallized in the form of fine platelets melting at 216–217°, and shows by analysis and other tests that it is $\Delta^5$-3-acetoxy-ternorcholenyl phenyl ketone (Formula II).

It is interesting to note that the ketone (II) which melted when crude at about 208° C., gave on mix melting with $\Delta^5$-3-acetoxy-etiocholenyl-methyl-diphenyl ethylene, a melting point of about 205°. Thus this ketone (II) might be an undetected contaminant in the usual preparations employed in degrading $\Delta^5$-3-acetoxy-bisnorcholenic acid. The procedure outlined in this invention, therefore, would insure the preparation of purer intermediates in the synthesis of certain hormones. The methyl zinc chloride reaction can be employed to give the ketone (II) and this on treatment with phenyl magnesium bromide gives the tertiary carbinol (III) purer and in much better yield than the older method involving reaction of the acid ester with the Grignard reagent.

EXAMPLE 3

With methyl zinc chloride and $\Delta^5$-3-acetoxy-bisnorcholenyl chloride treated essentially as outlined in Example 3, the corresponding methyl ketone, namely $\Delta^5$-3-acetoxy-ternorcholenyl methyl ketone is obtained having a melting point of about 165° C.

Having described the invention what we claim is:

1. The process for producing ketones of the general formula

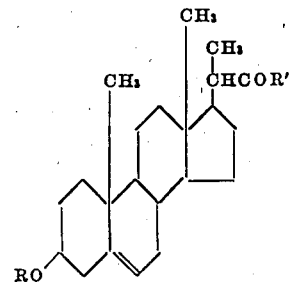

where R' is a hydrocarbon radical and R is an acyl radical, which involves subjecting an acid chloride of the formula

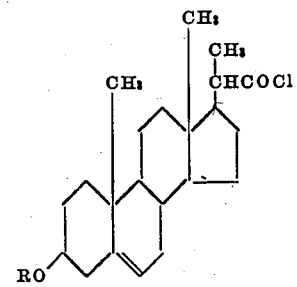

(where R is an acyl radical) to the action of a compound of the formula R'ZnX in which R' is a hydrocarbon radical and X is a halide radical.

2. The process for producing ketones of the general formula

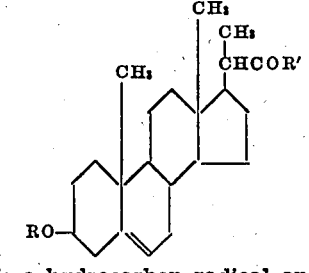

where R' is a hydrocarbon radical and R is an acyl radical, which involves subjecting an acid chloride of the formula

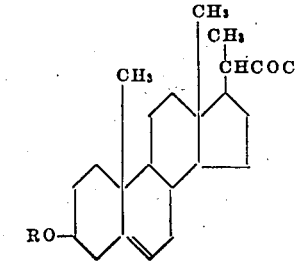

(where R is an acyl radical) to the action of a compound of the formula R'₂Cd, in which R' represents a hydrocarbon radical.

3. A ketonic product of the general formula

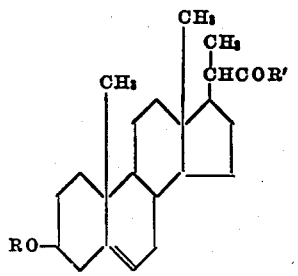

where R' is a hydrocarbon radical and R is an acyl radical.

4. The product Δ⁵-3-acetoxy-ternorcholenyl phenyl ketone of the formula

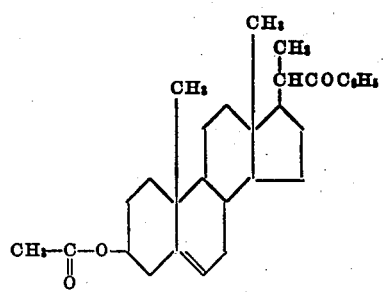

and of melting point about 217° C.

5. The product Δ⁵-3-acetoxy-ternorcholenyl methyl ketone of the formula

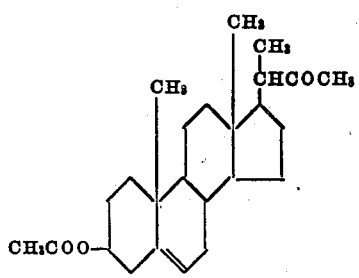

and of the melting point about 165° C.

6. The process for preparing tertiary carbinols of the formula

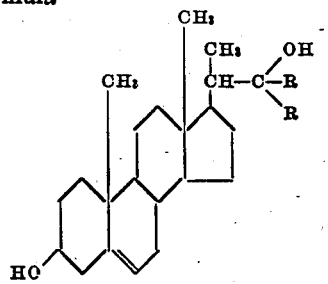

where R' is a hydrocarbon radical, which comprises subjecting ketones of the type described in claim 1 to the action of a Grignard reagent and hydrolyzing to give the free carbinol.

7. The process comprising subjecting Δ⁵-3-acetoxy-bis-norcholenic acid to the action of thionyl chloride, treating the resulting acyl chloride with a compound of the formula RZnCl in which R represents a hydrocarbon radical, reacting the resulting ketone with a Grignard reagent and hydrolyzing the resulting magnesium compound to form the Δ⁵-3-hydroxy-ternorcholenyl tertiary carbinol.

8. The process of producing ketones of the general formula

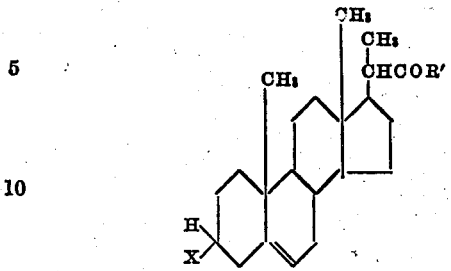

in which X is a group selected from the class consisting of OH or a group convertible to OH upon hydrolysis and R' is a hydrocarbon radical which involves subjecting an acid chloride of the formula

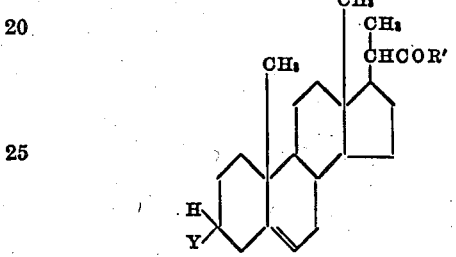

in which Y is a group convertible on hydrolysis to OH, to the action of an organo-metallic reagent selected from the class consisting of alkyl and aryl compounds of zinc, cadmium and aluminum.

9. A ketonic product of the general formula

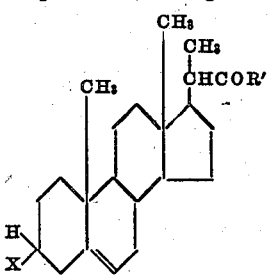

in which R' is a hydrocarbon radical and X is a group selected from the class consisting of OH or a group convertible to OH upon hydrolysis.

10. A process which comprises subjecting compounds of the formula

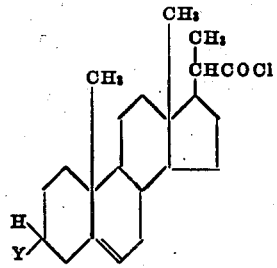

in which Y is a group convertible upon hydrolysis to the OH group, to the action of an organo-metallic reagent selected from the class consisting of akyl and aryl compounds of cadmium, zinc and aluminum, reacting the resulting ketone with a Grignard reagent, and hydrolyzing the resulting magnesium compound to form a tertiary carbinol.

PERCY L. JULIAN.
JOHN WAYNE COLE.